United States Patent
Vasquez et al.

(10) Patent No.: US 8,406,155 B1
(45) Date of Patent: Mar. 26, 2013

(54) CLOUD BASED CONTACT CENTER PLATFORM POWERED BY INDIVIDUAL MULTI-PARTY CONFERENCE ROOMS

(75) Inventors: Juan Vasquez, Mountain View, CA (US); Steve Osborn, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/424,008

(22) Filed: Mar. 19, 2012

(51) Int. Cl.
*H04L 12/16* (2006.01)
*H04L 12/28* (2006.01)
*H04L 12/56* (2006.01)
*H04Q 11/00* (2006.01)
*G06F 15/16* (2006.01)
*G06F 15/173* (2006.01)
*G06F 9/46* (2006.01)
*H04N 7/14* (2006.01)

(52) U.S. Cl. ........ 370/259; 370/401; 709/203; 709/204; 709/219; 709/226; 709/227; 348/14.09; 718/104

(58) Field of Classification Search ................... 370/259, 370/401; 709/203, 204, 219, 226, 227; 348/14.09; 718/104
See application file for complete search history.

(56) References Cited

U.S. PATENT DOCUMENTS

| | | | |
|---|---|---|---|
| 5,854,893 | A | 12/1998 | Ludwig et al. |
| 6,237,025 | B1 | 5/2001 | Ludwig et al. |
| 7,054,904 | B2 | 5/2006 | Ludwig et al. |
| 7,185,054 | B1 | 2/2007 | Ludwig et al. |
| 7,206,809 | B2 | 4/2007 | Ludwig et al. |
| 7,711,095 | B2 | 5/2010 | Erhart et al. |
| 7,769,148 | B2 | 8/2010 | Erhart et al. |
| 7,778,397 | B2 | 8/2010 | Erhart et al. |
| 2003/0059021 | A1 | 3/2003 | Meyerson et al. |
| 2003/0202088 | A1 | 10/2003 | Knight |
| 2004/0119814 | A1 | 6/2004 | Clisham et al. |
| 2006/0285662 | A1 | 12/2006 | Yin et al. |
| 2009/0287790 | A1 | 11/2009 | Upton et al. |
| 2010/0064334 | A1 | 3/2010 | Blackburn et al. |
| 2011/0249081 | A1 | 10/2011 | Kay et al. |
| 2011/0261144 | A1 | 10/2011 | Benefield et al. |
| 2011/0276654 | A1* | 11/2011 | Shedrinsky ............... 709/217 |
| 2011/0276901 | A1* | 11/2011 | Zambetti et al. ........... 715/753 |
| 2011/0276923 | A1* | 11/2011 | Zambetti et al. ........... 715/837 |
| 2011/0277027 | A1* | 11/2011 | Hayton et al. ................ 726/8 |
| 2012/0016961 | A1* | 1/2012 | Tuikka ..................... 709/217 |
| 2012/0047156 | A1* | 2/2012 | Jarvinen et al. ............ 707/758 |

* cited by examiner

*Primary Examiner* — Alpus H Hsu
*Assistant Examiner* — Yee Lam
(74) *Attorney, Agent, or Firm* — Leydig, Voit & Mayer, Ltd.

(57) ABSTRACT

The present disclosure includes a system and method for handling customer service requests in a virtual computing environment supporting multimedia interactions. In some embodiments, the system includes an automated management tool for receiving a customer service request from a client device, a server for establishing an individualized communication session, and a plurality of available resources capable of being connected to the individualized communication session. In some embodiments, the method includes receiving and establishing a connection between an automated management tool and a client device, receiving a customer service request from the client device, establishing an individualized communication session, and providing resources to the individualized communication session.

7 Claims, 7 Drawing Sheets

CLOUD BASED CONTACT CENTER PLATFORM POWERED BY INDIVIDUAL MULTI-PARTY CONFERENCE ROOMS

BACKGROUND

Traditional contact centers, which are examples of a point-of-contact (POC) for a customer seeking assistance for a product or service, generally rely on traditional communication systems. Conventional contact center platforms route customer service requests to various contact center resources, such as interactive voice response (IVR) bridges, agent's telephones, etc., that are connected using a traditional exchange or switch, such as a private branch exchange (PBX) or a Softswitch. If a customer is routed to one resource, e.g., IVR bridge, but fails to achieve full satisfaction, it may be necessary to route the customer to another resource, e.g., an agent, to complete the interaction. In a conventional call center platform connecting between the various resources is accomplished by sequentially transferring or handing off the customer to required resources via the exchange or switch.

Routing a customer service request using a conventional contact center platform generally proceeds in the following manner. First, a user initiates a service request by "calling" the contact center. The customer's call is accepted by, for example, the call center's PBX. The PBX routes the customer to a first resource, which may be an IVR bridge. The IVR bridge performs an initial interaction with the customer and extracts customer information and choices in order to determine whether the customer requires additional resources. In some instances the IVR is able to accumulate and dispense the necessary information to resolve the call. Often, the IVR bridge determines that it is necessary for the customer to interact with an agent or be transferred to other resources. In such transfers, the customer is returned to the PBX, which places the customer in a queue until an agent or other resource becomes available. Once an agent or other resource becomes available, the customer is transferred to that agent or resource. Depending upon the complexity of the service request, the agent may require additional resources to service the customer, such as authorization from the agent's supervisor, and the customer is, again, transferred. Transferring the customer among resources continues until the service request is satisfied or the service request is terminated.

Thus, in a conventional contact center platform, the customer is sequentially transferred to the next required resource via an exchange or switch, such as a PBX or Softswitch. As such, the customer's interaction with the contact center is subject to the limitations of the PBX or Softswitch, which include the tendency to unintentionally terminate the service request ("drop the call"). In addition, the pattern of transfer, wait, and connect can be repeated so often that customer satisfaction is negatively impacted. Tracking of the caller can also be adversely affected since the caller is continually transferring through the exchange or switch.

Separately, such traditional systems are limited if the customer's needs change over the course of the service request. Since the customer is sequentially transferred among resources, it becomes difficult to provide selected resources in real-time. Consequently, such traditional systems often cannot adequately manage the contact center resources and guarantee that the customer is being serviced by the appropriate resource at a given point of time during the service request.

Additional limitations can include the inability to permit the user to access a body of resources while on a call. The communications of such traditional contact centers are often limited to voice and IVR menus. When the customer is transferred to an agent, the agent might be able to connect a wider selection of resources, but transfers are often misapplied and the calls are lost. Further, in such cases, the time that the user remains waiting is lost. In such time periods, the customer is essentially locked down.

The limitations of such traditional systems have resulted in customers long dreading such calls. The calls being driven through the IVR traditionally take so long that, even if a call is not dropped as a result of a failed transfer, it is dropped as the caller moves into a zone of limited connectivity, as when the caller is using their cell phone in a moving car.

SUMMARY

The present disclosure includes a system and method for handling customer service requests in a virtual computing environment supporting multimedia interactions. A first embodiment describes a system for handling customer service requests in a virtual computing environment supporting multimedia interaction. The system comprises a contact center manager connected to a client device and receiving a customer service request from a customer, a server connected to the contact center manager and establishing an individualized communication session with the client device, such individualized communication session having a particular address, and a plurality of available resources capable of being connected with the individualized communication session with the client device at the particular address.

In this embodiment, the contact center manager is configured to identify a selected resource among the available resources and facilitate connection of the selected resource with the individualized communication session having the particular address. Additionally, the client device is not required to be transferred but remains in connection with the individualized communication session as the selected resource is joined with the individualized communication session.

The contact center manager may be configured to transfer a plurality of available resources into the individualized communication session and to remove a plurality of available resources out of the individualized communication session.

In some instances, the contact center manager is configured to transfer a plurality of available resources into the individualized communication session in parallel, and remove a plurality of available resources out of the individualized communication session in parallel.

Another embodiment describes a system for handling a customer service request in a virtual computing environment supporting multimedia communications sessions. The system comprises a client device configured to accept a customer service request from a customer, a server configured to host a multimedia communication session at a virtual location, wherein the client device is connected to the server via a communications channel, a contact center manager associated with the server, wherein the contact center manager receives the customer service request from the client device, instructs the server to initiate the multimedia communications session at the virtual location, and provides routing information that permits the customer to be routed to the virtual location.

The system further comprises a plurality of resources associated with the contact center manager, wherein the contact center manager is configured to couple at least one of the plurality of resources to the multimedia communication session without transferring the customer from the virtual location.

In some instances, the contact center manager is configured to transfer a plurality of resources into the multimedia communications session at the virtual location in parallel. In some instances, the contact center manager is configured to remove a plurality of resources out of the multimedia communications session at the virtual location.

Another embodiment describes a method at a client device for requesting service in a virtual computing environment supporting multimedia interaction comprising initiating a service request, sending the service request to a contact center located in the virtual computing environment, establishing a connection with a contact center manager, participating in an individualized communication session between a server connected to the contact center manager, the individualized communication session having a particular address, and receiving and consuming at least one of a plurality of resources configured to associate and dissociate with the individualized communication session, wherein the plurality of resources are configured to resolve the service request.

In a preferred embodiment, the method further comprises remaining in the individualized communication session at the particular address as the plurality of resources associate and dissociate with the individualized communication session until the service request is resolved. In some instances a plurality of resources are received and consumed in the individualized communication session in parallel.

DETAILED DESCRIPTION OF EXEMPLARY EMBODIMENTS

Figure 1:
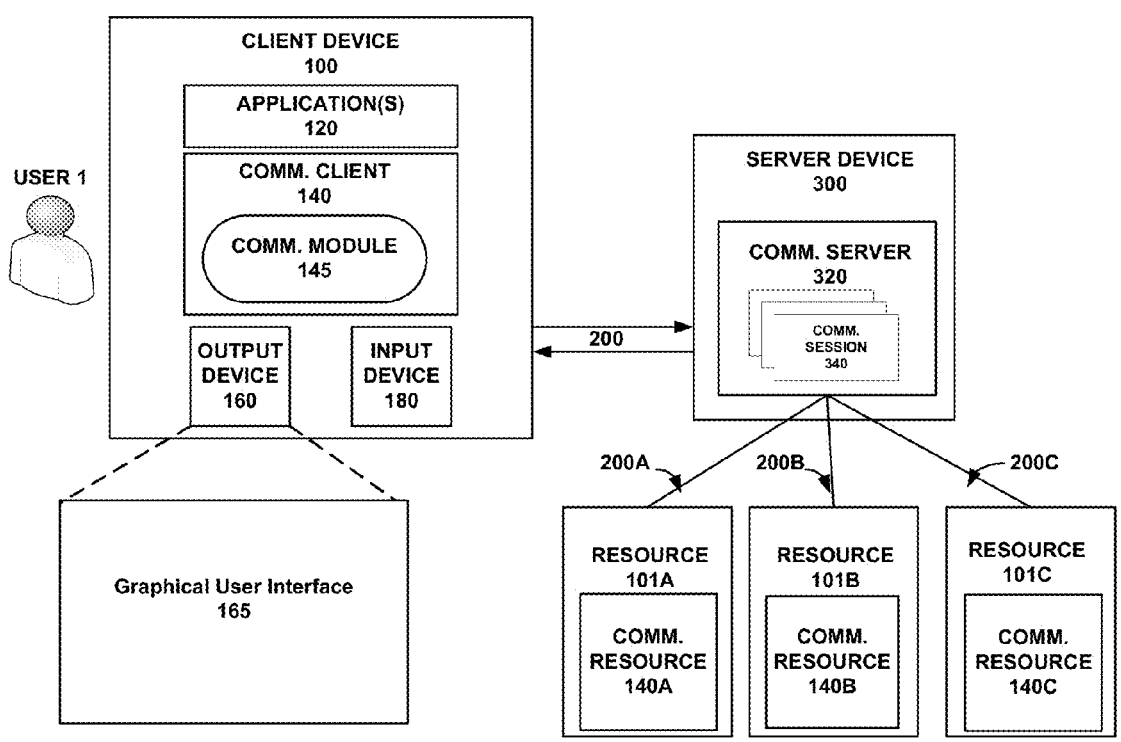
FIG. 1 is a block diagram of an exemplary system supporting a multimedia production environment, including a plurality of client machines interacting through a common communications session hosted by a server resource.

In an exemplary embodiment, a contact center platform establishes a cloud-based multi-media interaction with a customer. A customer is permitted to navigate to a contact center through IP selections and connections. Where traditional phone connections are utilized, the customer may dial a phone number and be connected through a Contact Center Bell (CCB).

In the contact center platform environment, a user is permitted to establish a multimedia production environment in which two or more individuals may interact in the same virtual location. Such contact center platform supports diverse communication tools to interact, collaborate, and/or share information. In an contact center environment, the location established as a virtual hangout is hosted by one or more servers that support communications sessions with user machines equipped with resources such as microphones and video cameras. For example, individuals participating in a contact center session may share and watch videos, participate in video, audio, or text chat, surf the web, seek or provide assistance regarding a particular problem, or any combination thereof.

When an individual desires to establish a contact center interaction in a virtual environment, the individual employs a client device to either initiate a virtual contact center session or join an existing virtual contact center session. When establishing a new virtual contact center session, the individual invites others to join the session. Typically, to join an existing virtual contact center session, each participant must be invited. Invitations arrive, for example, via e-mail, text messaging service, or any other suitable means. An individual can request to join an existing contact center session even though he or she has not received an invitation, assuming the URL for the session is known. Additionally, individuals participating in a virtual contact center session may cause the session to link to external resources and integrate those external resources into the participants' graphical user interface (GUI).

In one exemplary embodiment, a user initiates contact with the contact center platform indicating the desirability of establishing a session. Based on nascent characteristics of the initiation, such as the button pushed, the phone number called, or the phone number dialed, the request may be handled in different manners. For example, in the case of an IP initiation, a contact center manager (CCM) communicates with a room coordinator to identify a session reference, e.g., a JID, for a new session location. The user is then permitted to establish an individualized contact center session in the virtual environment.

The user is not transferred from the individual contact center session under most circumstances. Instead, resources are directed to the location and then combined into a multimedia or multisource platform. In some exemplary embodiments, resources are derived from different servers such as a media server and then provided to the contact center session. The signals from the user as well as such other resources are collected by a reflector and then consolidated into a single real time protocol (RTP) session comprising multiple independent streams.

For example, in a hypothetical scenario, a user might establish a contact center session with a particular location and identifier, which may comprise a JID or URL or other address. As an initial step, an IVR application may be directed to the contact center session where it may interact with the user. Depending on the nature of the communication link with the user (audio, audio/video, multimedia, etc), the contact center session and the IVR application can send content tailored to the user. At the end of the IVR, the user might need a contact center agent. Rather than transferring the call, the CCM initiates a connection between the contact center agent and the contact center session by directing the agent to the session location. When there, depending on the resources of the user, the contact center agent may initiate diverse resources such as video playback, internet access, etc. During the interims, the user is not placed on hold but is permitted to interact in the contact center session where there might be games, and other entertainment. Since the connection of the user to the contact center session is not transferred or otherwise redirected, the connection is very stable. This facilitates much greater stability in the call center session and increases customer satisfaction. In the hypothetical scenario just described, additional contact center resources, e.g., customer service agents, customer service supervisors, customers seeking similar assistance, session recording devices, etc., may be used in addition to or in combination with the IVR. In some instances, applying resources to the session in parallel reduces the duration of time required to resolve the customer service request.

An exemplary multimedia production environment is described in detail with respect to FIGS. 1-4. The illustrated environment is presented as an example, and does not imply any limitation regarding the use of other group networking environments. To the contrary, the description contemplates all implementations of multimedia production environments that route external multimedia resources into and out of multimedia communications sessions in the multimedia production environment.

Turning to FIG. 1, an exemplary client device 100 is connected to a call center communication session supporting a multimedia production environment that enables communication among various resources. Examples of client device 100 include, but are not limited to, portable, mobile, and/or stationary devices such as landline telephones, mobile telephones (including "smart phones"), laptop computers, tablet computers, desktop computers, personal digital assistants (PDAs), portable gaming devices, portable media players, and e-book readers. In some embodiments, two or more client devices are the same type of device. Similarly, resource devices 101A-C include similar communications. For example, client device 100 and resource device 101A may both be mobile telephones. In other embodiments, two or more client and resource devices are different types of devices. For example, client device 100 may be a mobile telephone and resource device 100B may be a desktop computer.

In the embodiment illustrated by FIG. 1, the client device 100 communicates with a server 300 via a communications channel 200. The communications channel typically includes an Internet connection between the client 100 and the server 300. The server 300 often comprises multiple physical servers such as a communications server 320 for maintaining or "hosting" one or more communication sessions, such as contact center communications session 340. Of course, each server can be a physically separate machine or it can be different processes running within the same physical machine.

In one exemplary embodiment, the client 100 maintains or hosts a contact center communications session and other resource devices such as resource devices 101A-C in FIG. 1 are routed to the communication session at the client 100 by server 300 or the like. Additionally, while depicted as a single device in FIG. 1, in some embodiments server 300 includes a plurality of interconnected devices maintained at different physical locations.

Communication sessions, such as communications session 340, at the communications server 320 are supported by an environment defined by a runtime engine executing at the server. For example, the runtime engine may be Google's "App Engine." The runtime engine provides the platform for the contact center session and supplies resources required for user interaction. The resources of the application engine are available to the contact center session by way of an application programming interface (API).

The client 100 of FIG. 1 includes application(s) 120, communications client 140, output device 160 (e.g., a display), and input device 180 (e.g., keyboard, mouse, touch screen). Application(s) 120 provide the client 100 with a variety of functionality. Generally, application(s) 120 employ the output device 160 to display information at a graphical user interface (GUI) 165. In alternative exemplary embodiments, the resources include other persons and application initiated content such as IVRs, etc.

The communications client 140 further includes a communications module 145 that enables output device 160 to display information at the GUI 165. The communications module 145 also enables the communications client 140 to connect to the communications server 320, allowing user 1 in FIG. 1 to establish or join a hangout session. Typically, the communications module 145 is a network module that connects the client 100 to a network such as the Internet using standard network protocol techniques. The communications resource 140A-C may also include similar functionality as communications client 140. However, other resources are included in exemplary embodiments. In this manner a client 100 and multiple potential resource devices 101A-C may join the same contact center communications session 340 hosted at the communications server 320. Through the communications session 340, the communications module 145 at the client 100 enables the user 1 to reside in a location where other resources may be provided or may be selected to join the session.

Once a contact center communications session 340 is established, a session channel 200 between the communications client 140 and the communications server 320 exchanges data, such as audio, video, text, and/or other information. In some embodiments, the data exchanged between the communications client 140 and the communications server 320 is optimized based, at least in part, on the hardware and/or software capabilities of client device 100. For example, if the client 100 is a mobile device connecting through to the communications session 340 by way of a bandwidth limited path such as a cellular network, communications server 320 may optimize the number and quality of the audio, video, text, and/or other information sent to client device 100. Furthermore, communications client 140 may dynamically adjust the bit rate required to send the information to communications server 320 by, for example, reducing the quality of the audio, video, text, and/or other information being sent to communications server 320.

GUI 165 is an illustrative example of a GUI from which a contact center communications session may be initiated and sustained. In the illustrated embodiment, GUI 165 includes information about one or more other resources connected to user 1 by the contact center communications session 340. The GUI may also include information about other resources user 1 may access, notifications of events and other information relevant to user 1.

In order to establish or join a contact center communications session, user 1 interacts with GUI 165 to cause communications client 140 to generate a request to create a new communications session 340 or join an existing communications session. For example, GUI 165 may include a "Get Help" button that user 1 activates in order to create a new contact center communications session. In response to user 1 activating the Get Help button, communications client 140 sends a request to initiate a new communications session 340 to communications server 320, which establishes a new contact center communications session.

As the new session is initiated, various resources, such as resources 1A-C in FIG. 1, may be directed to the session as needed without the user being transferred. For example, an IVR may be initiated as a resource 1A. The IVR may permit the user to hear communications directed at identifying and solving the help issues identified by the user 1. As the IVR provides its resource, a CCM can receive information that is processed to determine other resources, e.g., 1B-C, that should be provided. As the resources are provided, the user 1 is not required to have disruption of service.

In one alternative exemplary embodiment, user 1 may request to join an existing contact center communications session 340. The user 1 selects a "join prior contact center" icon at the GUI 165 and selects a session from a displayed list of available contact center sessions at the GUI or selects a "join contact center" icon displayed in an external source such as an instant message or posting. However communicated to the user 1, in response to user 1 initiating an attempt to join an existing virtual hangout session, communications client 140 sends a request to join the communications session 340 to the communications server 320. The request includes an identifier of the particular communications session 340. The identifier may be included in the join link for the virtual contact center. Communications server 320 connects communications client 140 to the specified communications session 340.

Figure 2:
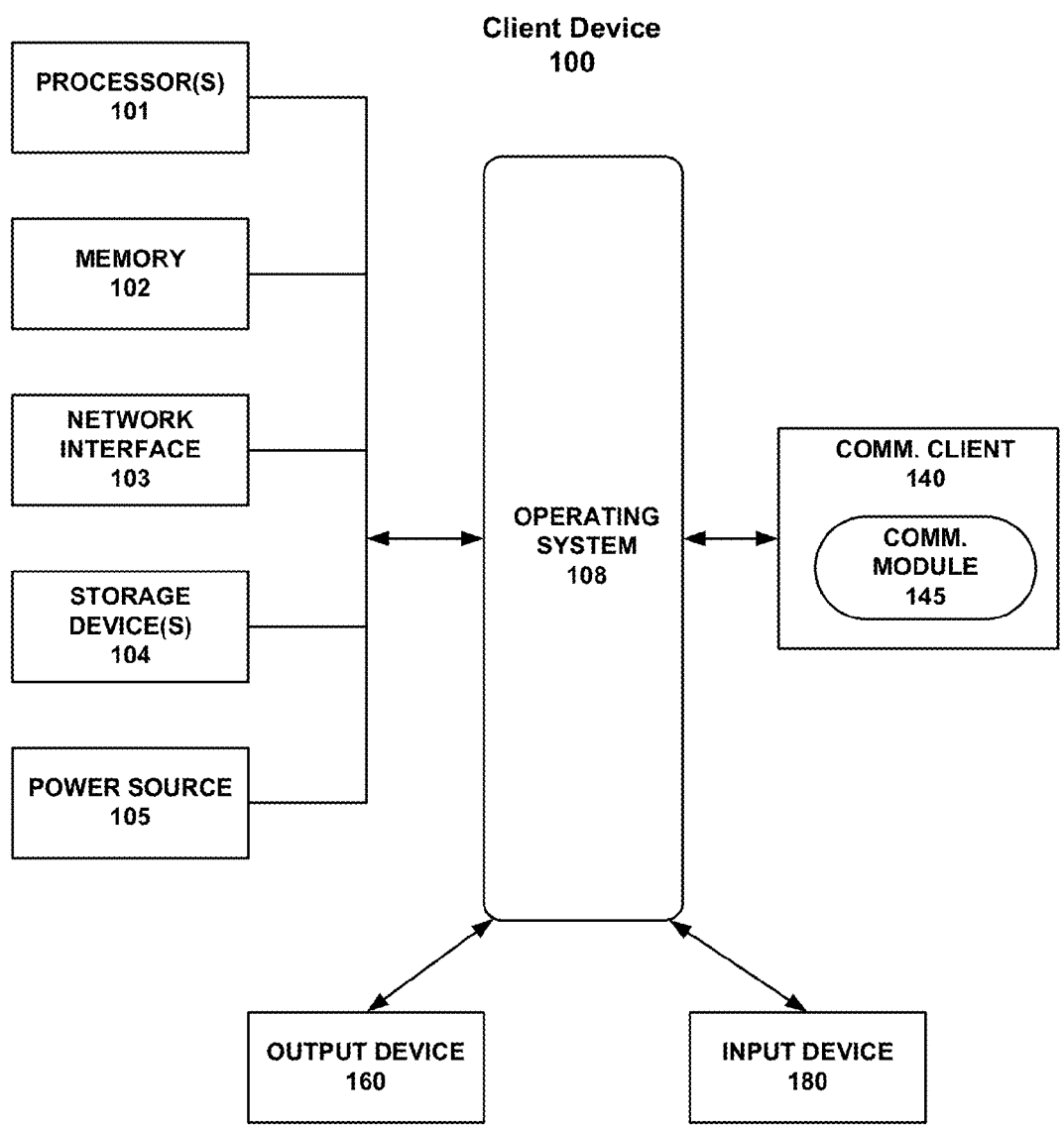
FIG. 2 is a block diagram of basic functional components for one of the client machines in FIG. 1.

Referring now to FIG. 2, one particular example of client device 100 is illustrated. In general, many other embodiments of the client 100 may be used as long as they support at least limited participation in the communications sessions. In the illustrated embodiment of FIG. 2, the client 100 includes one or more processors 101, memory 102, a network interface 103, one or more storage devices 104, power source 105, output device 160, and input device 180. The client 100 also includes an operating system 108 and a communications client 140 that are executable by the client. In a conventional fashion, each of components 101, 102, 103, 104, 105, 160, 180, 108, and 140 are interconnected physically, communicatively, and/or operatively for inter-component communications.

As illustrated, processors 101 are configured to implement functionality and/or process instructions for execution within client device 100. For example, processors 101 execute instructions stored in memory 102 or instructions stored on storage devices 104. Memory 102, which may be a non-transient, computer-readable storage medium, is configured to store information within client 100 during operation. In some embodiments, memory 102 includes a temporary memory area for information not to be maintained when the client 100 is turned off. Examples of such temporary memory include volatile memories such as random access memories (RAM), dynamic random access memories (DRAM), and static random access memories (SRAM). Memory 102 maintains program instructions for execution by the processors 101.

Storage devices 104 also include one or more non-transient computer-readable storage media. Storage devices 104 are generally configured to store larger amounts of information than memory 102. Storage devices 104 may further be configured for long-term storage of information. In some examples, storage devices 104 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client 100 uses network interface 103 to communicate with external devices via one or more networks, such as one or more wireless networks. Network interface 103 may be a network interface card, such as an Ethernet card, an optical transceiver, a radio frequency transceiver, or any other type of device that can send and receive information. Other non-limiting examples of network interfaces include Bluetooth®, 3G and WiFi® radios in mobile computing devices, and USB. In some embodiments, the client 100 uses network interface 103 to wirelessly communicate with an external device such as the server 300 of FIG. 1, a mobile phone, or other networked computing device.

The client 100 includes one or more input devices 180. Input device 180 is configured to receive input from a user through tactile, audio, and/or video feedback. Non-limiting examples of input device 180 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 160 are also included in client device 100. Output device 160 is configured to provide output to a user using tactile, audio, and/or video stimuli. Output device 160 may include a display screen (part of the presence-sensitive screen), a sound card, a video graphics adapter card, or any other type of device for converting a signal into an appropriate form understandable to humans or machines. Additional examples of output device 160 include a speaker, a cathode ray tube (CRT) monitor, a liquid crystal display (LCD), or any other type of device that can generate intelligible output to a user.

The client 100 includes one or more power sources 105 to provide power to the client. Non-limiting examples of power source 105 include single-use power sources, rechargeable power sources, and/or power sources developed from nickel-cadmium, lithium-ion, or other suitable material.

The client 100 includes an operating system 108 such as the Android® operating system. The operating system 108 controls operations of the components of the client 100. For example, the operating system 108 facilitates the interaction of communications client 140 with processors 101, memory 102, network interface 103, storage device(s) 104, input device 180, output device 160, and power source 105. As illustrated in FIG. 2, communications client 140 includes communications module 145. Each of communications client 140 and communications module 145 typically includes program instructions and/or data that are executable by the client 100. For example, in one embodiment communications module 145 includes instructions causing the communications client 140 executing on the client 100 to perform one or more of the operations and actions described in the present disclosure.

In some exemplary embodiments, communications client 140 and/or communications module 145 form a part of the operating system 108 executing on the client 100. In other embodiments, communications client 140 receives input from one or more of the input devices 180 of the client 100. Communications client 140 preferably receives audio and video information associated with a communications session 340 from other client devices participating in the communication session.

Figure 3:
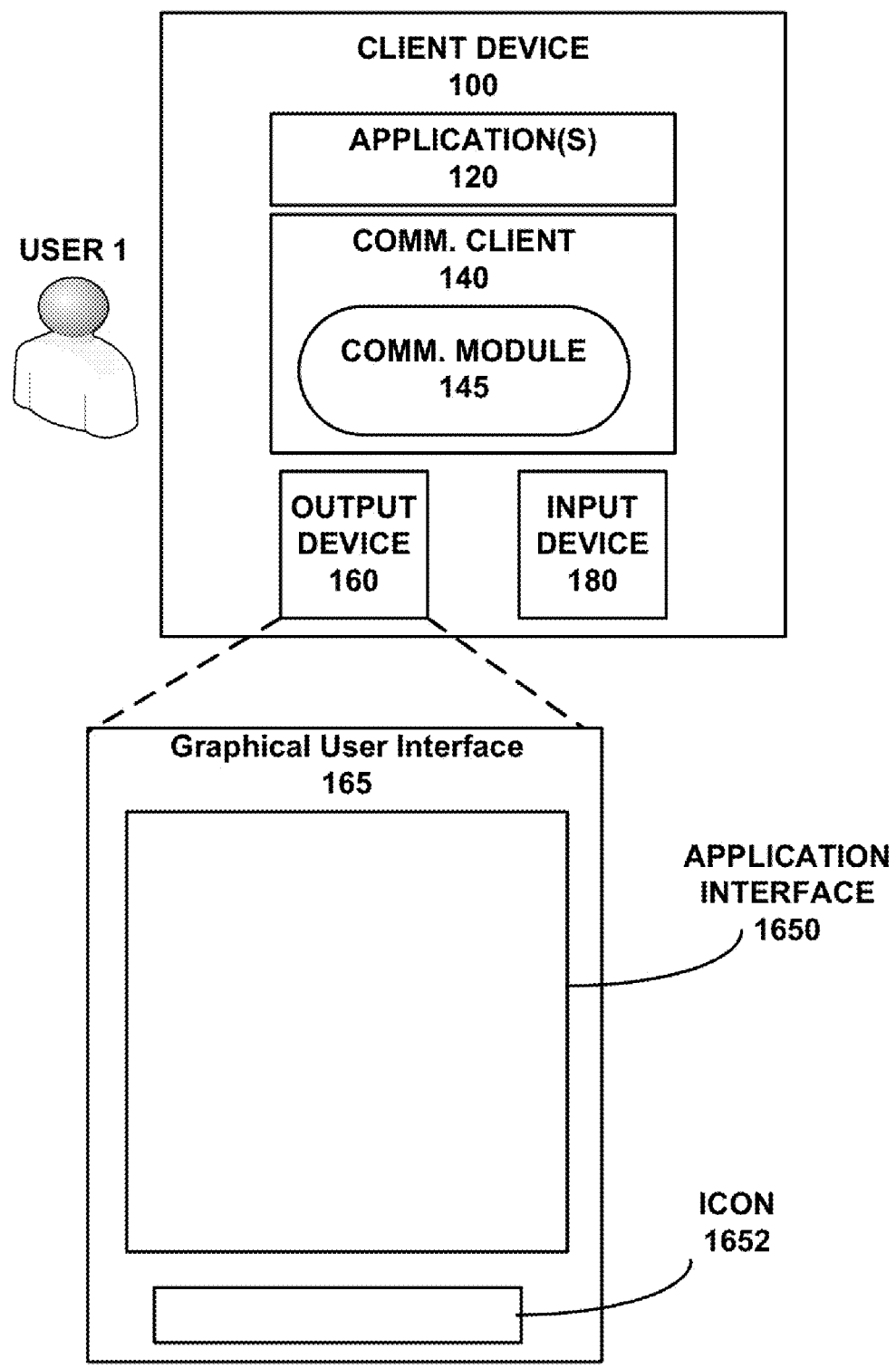
FIG. 3 is an application level block diagram of the client machine in FIG. 2, illustrating exemplary executable components supporting at the client a group interaction experience within the multimedia production environment.

FIG. 3 illustrates an exemplary configuration of the client 100 when it creates an ambient contact center session. The communications module 140 initiates a contact center session from the client 100 and maintains the session with the communications session 340 at the server 320 while the client performs other tasks. As shown in FIG. 3, GUI 165 displays application interface 1650. Application interface 1650 allows user 1 to use and interact with application(s) 120, which in one embodiment can be a internet browser such as Google Chrome®. In some examples, application interface 1650 is a graphical display that is not interactive.

The communications client 140 causes GUI 165 to display a user-selectable icon 1652. Non-limiting examples of the icon 1652 are a virtual or graphical button, such as a key of a virtual keyboard, a touch-target, a physical button of client device 100, or a button on an input device 180 coupled to client device 100, such as a mouse button, a button on a mobile device, or a key of a keyboard. Of course, GUI 165 may include other graphical controls as well.

Figure 4:
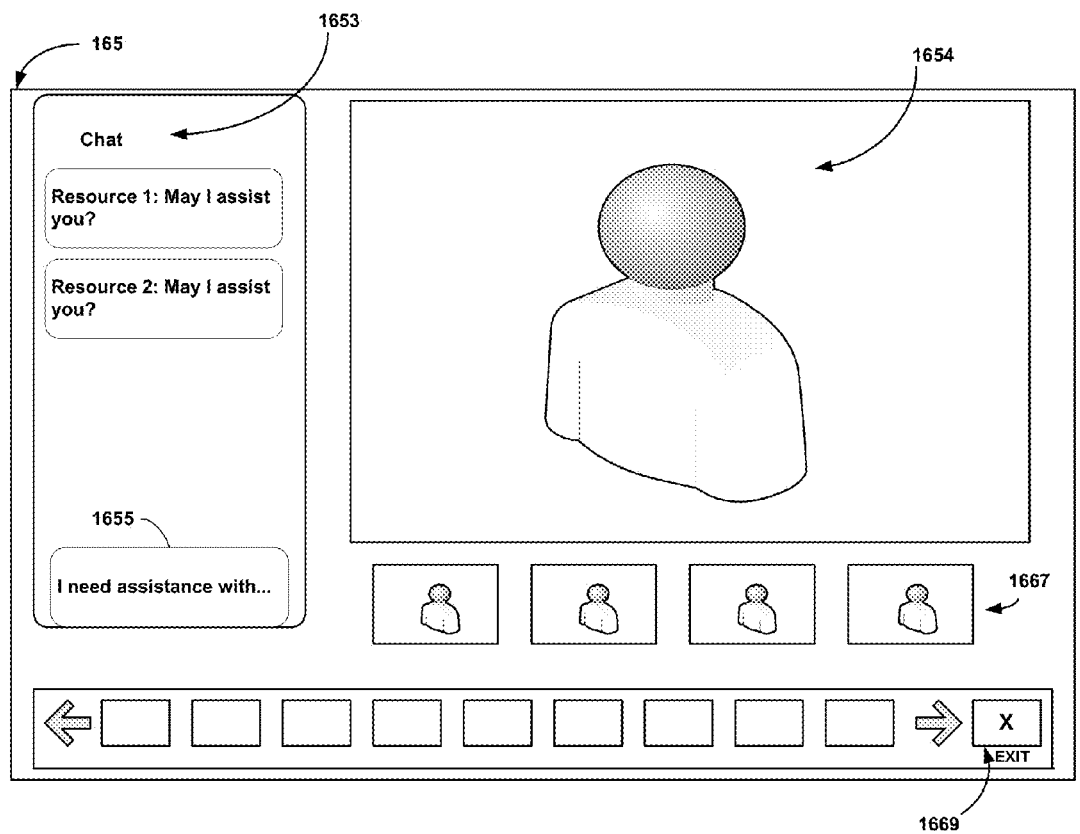
FIG. 4 is an exemplary graphical user interface at the client machine of FIGS. 2 and 3 available to a user for the group interaction experience.

The graphical user interface (GUI) of FIG. 4 is an example of the GUI 165 of client 100 of FIGS. 1 and 3. However, the graphical display of FIG. 4 may be outputted using other devices. A client application supporting contact center sessions is typically web-based contained within an internet browser session. The application exposes a number of features to the user through the GUI. These graphically displayed features include a video display 1654 of one or more resources in the session. A chat feature 1653 is also provided, including a chat history and a field 1655 where a user can, such as user 1, input text to the chat conversation. GUI 165 is also configured to display graphical images 1667 that are associated with resources in the session. Graphical images 1667 may include images of agents currently participating in the contact center session. Exit button 1669 is provided so that the user may terminate the contact center communications session as desired.

Figure 5:
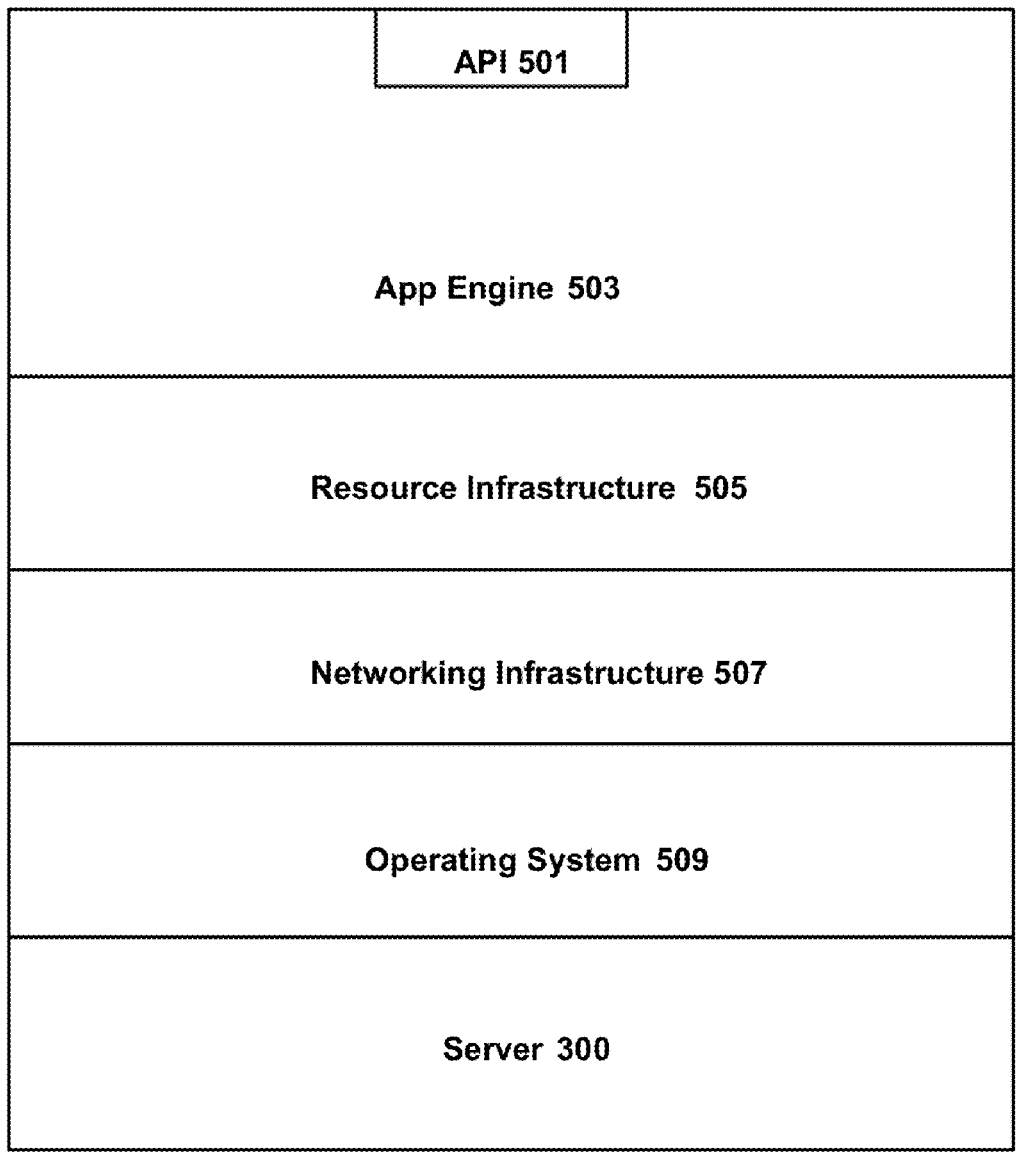
FIG. 5 is a block diagram of an application at the server of FIG. 1 that supports the multimedia production environment and interaction among the client machines through their respect graphical user interfaces.

Referring to FIG. 5, in one embodiment, an application programming interface (API) 501 of an Application Engine or App Engine 503 provides many resources to the communications session 340 (e.g., a hangout session). In turn, the App Engine 503 depends on resources provided from an API exposed by an Resources Infrastructure Layer 505 and a Networking Layer 507, which are supported by the server 300 and their Operating Systems 509. The App Engine 503 and the Resource Infrastructure Layer 505 connect HTTP requests from the user to the communications sessions, such as communications session 340. The App Engine 503 also provides a runtime environment for the communications sessions. Administrative support for the communications sessions are provided by the a Contact Center Manager (CCM) in the App Engine 503. The App Engine 503 also provides access to a database in the Resource Infrastructure Layer 505 for persistent storage requirements of the communications sessions.

Through its API 501, the App Engine 503 provides the communications sessions access to resources on the Internet, such as web services or other data. The App Engine 503 retrieves web resources using the Resource Infrastructure Layer 505. The communications sessions also send and receive messages using the App Engine 503 and the Resource Infrastructure Layer 505. The App Engine 503 and the Resource Infrastructure Layer 505 also supports a cache, which is useful for temporary data or data copied from the datastore to the cache for high speed access. The Resource Infrastructure Layer 505 also supports a file system and scheduling resources. An example of the App Engine, Google's App Engine. An example of the Resource Infrastructure Layer 505, the Networking Infrastructure 507 and the Operating System 509 is Google's supporting infrastructure and operating system for its App Engine.

Figure 6:
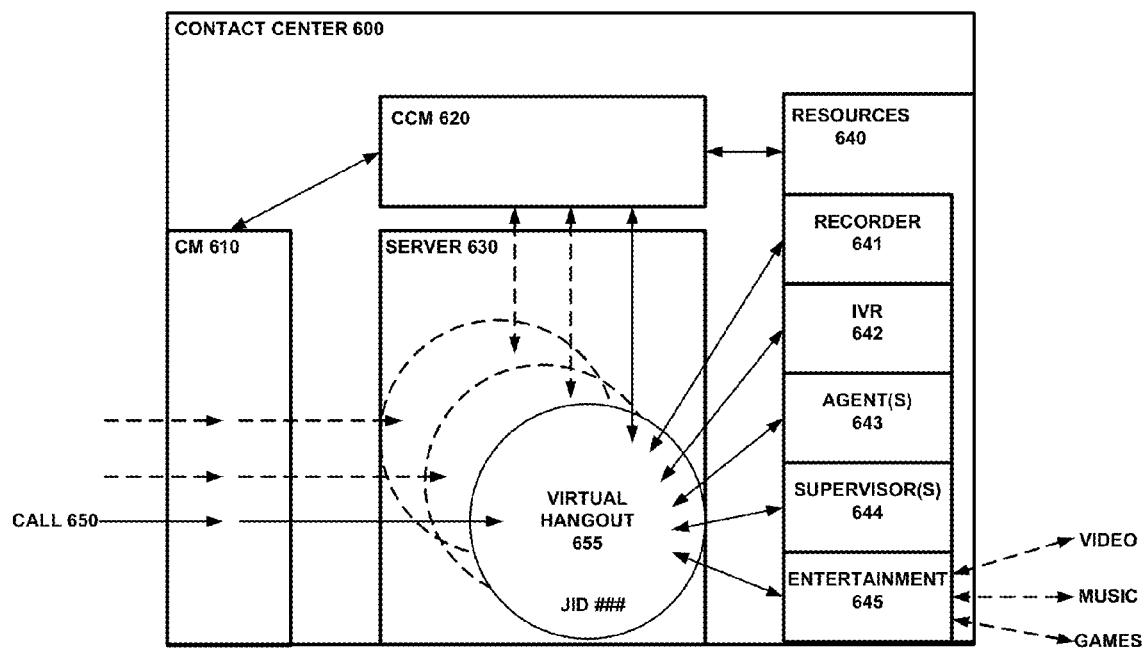
FIG. 6 is a block diagram illustrating an exemplary contact center including a multimedia production environment for hosting communications sessions to assist customers during service requests.

FIG. 6 is a block diagram illustrating an exemplary contact center including a multimedia production environment for hosting communications sessions to assist customers during service requests. In some instances, the multimedia production environment depicted in FIG. 6 is the virtual hangout environment described in FIGS. 1-5. As depicted, the contact center 600 includes a connection manager, e.g., CM 610, an automated management tool, e.g., CCM 620, a server 630 for hosting multimedia communications sessions, and a plurality of contact center resources 640. In preferred embodiments, the CM 610 includes a CCB to handle service requests over traditional phone connections. The resources 640 include, but are not limited to, a recorder 641 for recording events during the communications sessions, an IVR 642, one or more customer service agent(s) 643, one or more customer service supervisor(s) 644, and entertainment unit(s) 645. Preferably, the entertainment unit(s) 645 are associated with communications sessions during wait periods where a customer is waiting to access unavailable resources. The entertainment unit(s) 645 include, but are not limited to, video, music, and game units. In this embodiment, contact center 600 monitors the contact center communications sessions using the automated management tool, such as a CCM 620, to determine the contact center recourses necessary to assist the customer and resolve the service request quickly and efficiently.

In the embodiment described by FIG. 6, a customer seeking assistance with a product or service associated with contact center 600 places the call 650 using a client device. As mentioned in the description of FIGS. 1-4, exemplary client devices include, but are not limited to, one or more portable, mobile, and/or stationary devices such as landline telephones, mobile telephones (including "smart phones"), laptop computers, tablet computers, desktop computers, personal digital assistants (PDAs), portable gaming devices, portable media players, and e-book readers. Depending upon the client device that the customer uses during the service request, information exchanged between the customer and the contact center via in the virtual hangout environment may take the form of audio, video, text, and/or any combination thereof. The CM 610 receives the call 650 and notifies the CCM 620 that a new service request has been received at contact center 600. In some embodiments, the CM 610 transfers attributes of the call 650, e.g., information in header files, to the CCM 620 for analysis.

The CCM 620 of FIG. 6, which organizes communication among the various components of contact center 600, routes the call 650 to virtual hangout 655 maintained by the server 630. The virtual hangout 655 may be a new or an existing communications session that is identified by a unique identifier or address, e.g., a unique JID. The virtual hangout 655 resides in the multimedia production environment hosted by the server 630. In some embodiments, some or all of the computing environment described in FIG. 5 is used by the contact center 600. In some instances, virtual hangout 655 is described as a "virtual location" where the customer may interact with one or more contact center resources 640, including 641-645, and the customer placing the call 650 is described as residing at the virtual location. In preferred embodiments, once the call 650 is transferred to the virtual hangout 655 (e.g., once the customer resides at the virtual location), it is not necessary to transfer the call 650 out of the virtual hangout 655. Rather, in preferred embodiments, the call 650 is maintained in the virtual hangout 655 until the service request is resolved.

In the embodiment described by FIG. 6, once a customer resides at a virtual location, e.g., the virtual hangout 655, contact center resources 640 (including 641-645) are transferred into and out of virtual hangout 655 by the CCM 620 in order to assist the customer and resolve the service request. Contact center resources 640 may be transferred into and removed from virtual hangout 655 in parallel based upon the needs and complexity of the service request. In some embodiments, resources executing inside a virtual hangout communicate with CCM 620 by transferring information associated with the service call and other data to the CCM 620. In some instances, when the CCM 620 determines that a specific resource is required in a specific communications session, the CCM 620 passes an instruction, which may include the unique identifier of the session, to the specific resource directing the specific resource to associate with the identified session. Of course, embodiments of the invention envisage assisting a plurality of customers in a plurality of virtual hangouts simultaneously.

Figure 7:
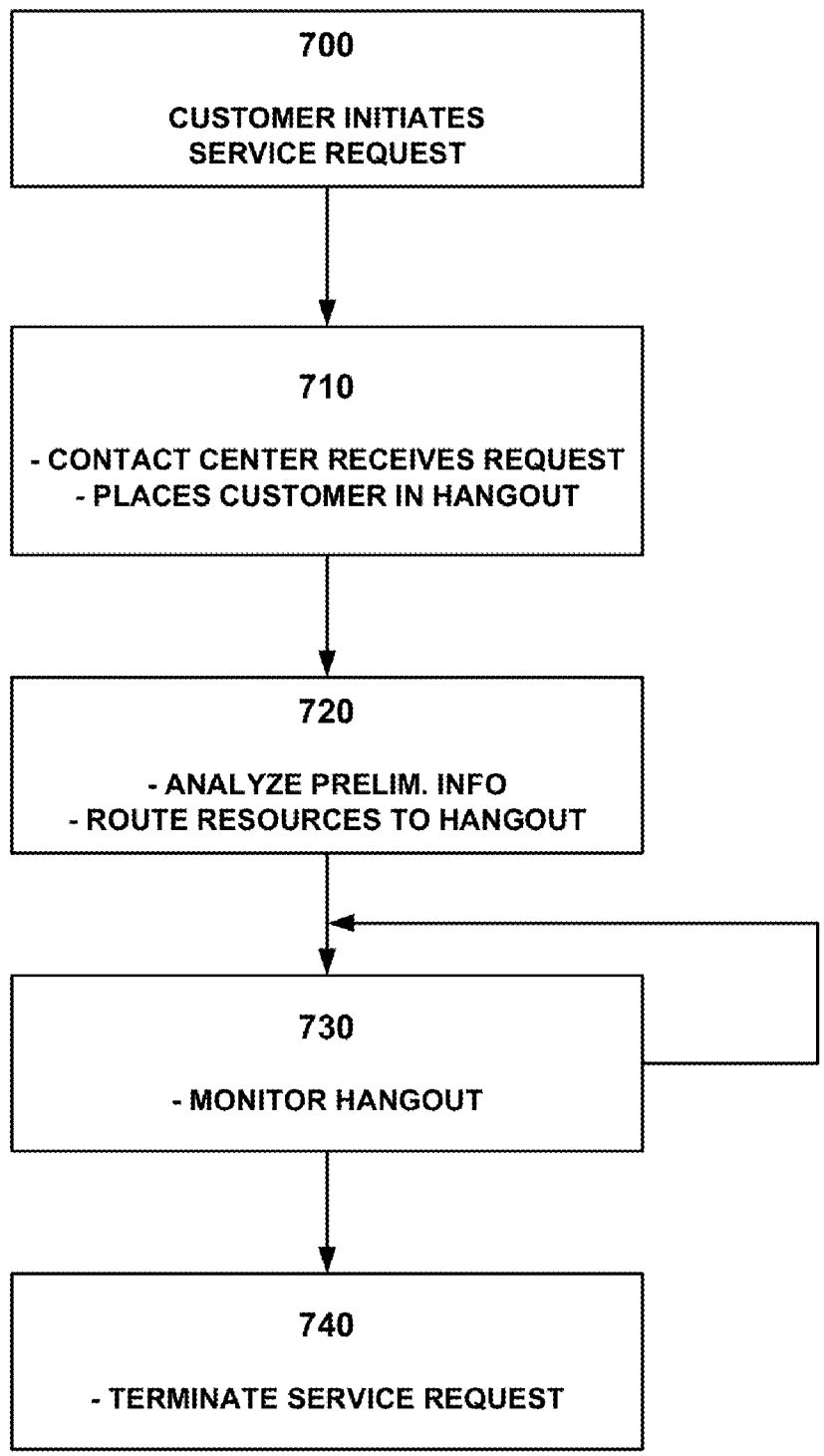
FIG. 7 is a flow chart illustrating a first method of resolving a customer service request in accordance with embodiments of this disclosure.

FIG. 7 is a flow chart illustrating a first method of resolving a customer service request in accordance with embodiments of this disclosure. Referring to FIG. 7, a customer service request is initiated at step 700 when a customer seeks assistance by placing a call to a contact center that is associated with a product or service that the customer is using. The customer places the call using a client device.

At step 710, the contact center receives the service request initiated by the customer and places the customer into a virtual hangout session. In some embodiments, the contact center uses connection manager, such as the CM 610 of FIG. 6, to receive the call and notify a management tool, such as the CCM 620 of FIG. 6, of the service request. In these embodiments, the CCM establishes and monitors all active and inactive virtual hangout sessions maintained by the contact center. In response to receiving notification of a new service request, the CCM may either establish a new virtual hangout session or route the customer to an existing virtual hangout session.

In some embodiments, CCM establishes a new virtual hangout for each new customer service request. Thus, once notified of a new request, the CCM establishes a new virtual hangout, generates a new hangout identification number (e.g., JID), and routes the customer into the newly established virtual hangout. In this embodiment, the CCM invites an automated human-computer interaction unit into the virtual hangout in order to extract attributes, including preliminary information, from the customer that may be used to assess the service request. Preliminary information includes, but is not limited to, personal information about the customer (e.g., name, account number, account status, etc.), the products or services that customer is requesting assistance with, or any other information that may be helpful to determine the cause of the service request and the resources required to satisfy the request. In some embodiments, the automated human-computer interaction unit is an IVR. An IVR extracts preliminary information from the customer by executing a script comprising predetermined questions. The IVR records the customer's responses and reports the information to the CCM.

In another embodiment, upon receiving notification of a new service request, the CCM determines if there are any available customer service agents in existing virtual hangout sessions. In some instances, existing virtual hangouts are inactive because the customer service agent is the only individual currently participating in the virtual hangout. In the case that there is an available customer service agent in an existing virtual hangout, the CCM routes the customer to the existing virtual hangout and the customer service agent extracts attributes, including preliminary information, and other data from the customer. In this embodiment, the CCM establishes a new virtual hangout session, routes the customer to the new virtual hangout session, and transfers an IVR to extract preliminary information when there are no available customer service agents upon receiving notification of a new service request.

Alternatively or in addition to the previously described embodiments, upon receiving notification of a new service request, the CCM determines if there are existing virtual hangout sessions that are directed to resolving the same or a similar service request. In the case where one or more such virtual hangout session(s) exist, the CCM provides the customer making the new service request with the option of joining the existing virtual hangout. Providing the customer with the option to join includes, but is not limited to, presenting the customer with an interactive list, e.g., a list of URLs that the customer may select from, presenting the customer with one more "join existing service call" button(s), etc. In some instances, if the customer chooses to join an existing virtual hangout session, the customer is routed to the selected virtual hangout session and interacts with one or more other customers in addition to the contact center resources. In other instances, if the customer does not elect to join the existing virtual hangout, the CCM places the customer in a virtual hangout session as described above.

At step 720, the CCM receives and analyzes the attributes and determines the contact center resources that are required to service the customer. In some embodiments, the CCM refers to a predetermined list of business rules to determine the contact center resources that are required and available to service the customer. Once the appropriate resources have been identified, the CCM determines which resources are currently available to assist the customer and transfers one or more available resources into the virtual hangout. For example, upon receiving preliminary information, the CCM may determine that a recorder and a customer service agent are necessary to service the customer. In this case, both resources are transferred into the virtual hangout in parallel. Alternatively, a customer service agent may not be immediately available. In this case, the CCM may transfer music and/or a video into the virtual hangout in order to entertain the customer during wait periods.

At step 730, the CCM monitors the virtual hangout session and determines if additional resources need to be transferred into the virtual hangout. In some embodiments, resources executing inside the virtual hangout continuously update the CCM with additional information relevant to the service request. The additional information includes, but is not limited to, status updates, suggestions regarding additional resources required to service the customer, and whether a resource has completed its task and should be removed from the virtual hangout. Similar to step 720, the CCM analyzes the additional information and determines the contact center resources that are required and available to service the customer. For example, a customer service agent executing inside a virtual hangout may determine that one or more supervisors are required to complete the customer service request. In this case, the customer service agent notifies the CCM and, when available, the CCM transfers the supervisors into the virtual hangout. The CCM monitors, adds, and removes contact center resources in the virtual hangout until the service request is satisfied.

At step 740, the CCM determines that the customer service request has been satisfied, removes any resources still executing inside the virtual hangout, and terminates the virtual hangout, thus terminating the service request.

As described in FIGS. 6 and 7, unlike conventional contact center platforms where customers are routed to resources in a sequential manner, the contact center platform described in accordance with embodiments of this disclosure route contact center resources to virtual hangouts where customers reside. Additionally, resources may be delivered to and removed from virtual hangouts in parallel based upon the needs and complexity of service requests. Once an communications session has been established, it is not necessary to transfer the customer out of the session until the service request is resolved.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for handling customer service requests in a virtual computing environment supporting multimedia interaction, the system comprising:
   a contact center manager receiving a customer service request from a client device over a network;
   a server connected to the contact center manager and establishing an individualized and on-going service request session with the client device over the network, such on-going service request session having a particular address; and
   a plurality of available resources configured to be connectable with the on-going service request session with the client device at the particular address,
   wherein the contact center manager is configured to
      determine that certain resources out of the plurality of available resources should be made available in the on-going service request session to assist in resolving the customer service request, such determination being repetitive and dynamic during the on-going service request session;
      instruct connection of certain specific resources with the on-going service request session having the particular address based on determining that the certain specific resources should assist in resolving the customer service request,
      monitor the certain specific resources as the resources operate in the on-going service request session to assist in resolving the customer service request,
      instruct disconnection of the certain specific resources from the on-going service request session based on monitoring the operation of the resources, and
   wherein the client device is permitted to remain in connection with the on-going service request session as the certain resources are connected with the on-going service request session, thereby avoiding service interruption, and
   wherein the server is configured to connect at least one additional client device to the on-going service request session.

2. The system of claim 1, wherein the plurality of available resources include at least one of a recorder, an interactive response application, a customer service agent, a customer service supervisor, and entertainment applications.

3. The system of claim 2, wherein the contact center manager is configured to
   transfer one or more of the plurality of available resources into the on-going service request session, and
   remove one or more of the plurality of available resources out of the on-going service request session.

4. The system of claim 1, further comprising:
   a connection manager configured to receive the customer service request and notify the contact center manager of the customer service request.

5. The system of claim 1, wherein the on-going service request session having the particular address is a virtual hangout.

6. The system of claim 1, wherein the particular address is an address in a cloud computing environment.

7. The system of claim 1, wherein the at least one additional client device is associated with one of
   a customer service agent connected to the on-going service request session to assist in resolving the customer service request, and
   a second customer having a second customer service request related in subject matter to the customer service request.

* * * * *